United States Patent [19]
Duipmans

[11] Patent Number: 5,245,260
[45] Date of Patent: Sep. 14, 1993

[54] MOTOR DRIVE CIRCUIT WITH ELECTRONIC FAULT PROTECTION

[75] Inventor: Hendricus J. Duipmans, Hoogeveen, Netherlands

[73] Assignee: U.S. Philips Corporation, New York, N.Y.

[21] Appl. No.: 828,432

[22] Filed: Jan. 29, 1992

[30] Foreign Application Priority Data

Feb. 8, 1991 [NL] Netherlands ................ 9100223

[51] Int. Cl.⁵ .............................................. H02P 1/00
[52] U.S. Cl. .................................... 318/446; 361/23; 361/190
[58] Field of Search ............... 318/138, 254, 435, 62, 318/101, 264, 447, 446, 452, 484; 361/23, 29, 31, 28, 139, 97, 160, 166, 170, 187, 189, 190, 195, 196; 307/112, 113, 115, 125, 116, 130, 139–141, 141.4, 141.8

[56] References Cited

U.S. PATENT DOCUMENTS

| | | | |
|---|---|---|---|
| 3,554,343 | 1/1971 | Calvert et al. | 361/190 X |
| 3,700,914 | 10/1972 | Granieri et al. | 307/141 |
| 3,781,622 | 12/1973 | Acton et al. | 318/466 |
| 3,800,205 | 3/1974 | Zalar | 318/482 |
| 3,840,322 | 10/1974 | Cade | 307/117 |
| 4,107,645 | 8/1978 | Lewis et al. | 307/141 |
| 4,251,848 | 2/1981 | Dogadko et al. | 361/190 X |
| 4,636,697 | 1/1987 | Kunikawa | 318/254 X |
| 4,774,443 | 9/1988 | Herzig | 318/439 X |
| 4,983,897 | 1/1991 | Tennant | 307/116 X |

*Primary Examiner*—Jonathan Wysocki

[57] ABSTRACT

An appliance provided with an electric motor and a circuit for driving the electric motor. The drive circuit includes a first pulse switch (S1) for generating a first pulse and a first switching device ($\mu$C, T) having a holding capability and which performs a first switching function in response to the first pulse. A second pulse switch (S2) generates a second pulse. A second switching device (Th, R) having a holding capability performs a second switching function in response to the second pulse. A main switching device switches the electric motor. The first switching function in combination with the second switching fucntion are adapted to control the main switching device. Optionally, the circuit may include a control device (Tr) for controlling the electric motor and a third pulse switch (S3) for resetting the first switching function.

20 Claims, 1 Drawing Sheet

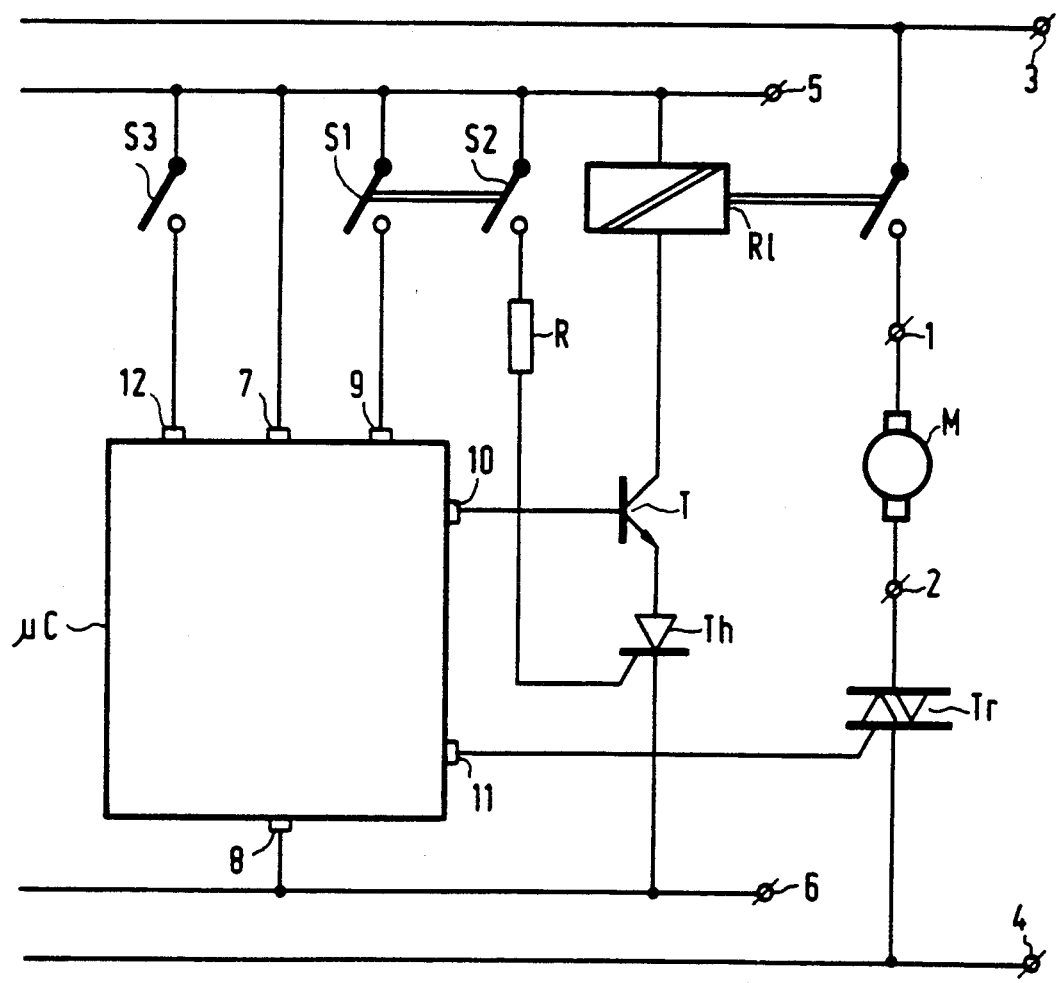

MOTOR DRIVE CIRCUIT WITH ELECTRONIC FAULT PROTECTION

BACKGROUND OF THE INVENTION

This invention relates to an appliance comprising at least an electric motor and a circuit for driving the electric motor, which circuit comprises a first pulse switch for generating a first pulse, first switching means with a holding capability to perform a first switching function in response to the first pulse, and main switching means for switching the electric motor, the first switching function being adapted to control the main switching means.

Such an appliance may take the form of, for example, a food processor, in which the electric motor is coupled to a rotatable cutter. A food processor can be used for food processing, such as for example vegetable shredding.

An appliance at least comprising the electric motor and the circuit for driving the electric motor is generally known, the first pulse switch being frequently constructed by means of a push-button. Such a push-button switch usually comprises a fragile spring contact, which spring contact in the case of energization is closed briefly to generate a pulse. Since the first switching means have a holding capability these switching means are responsive to the first pulse generated by the first pulse switch to perform the first switching function for at least a first time interval, which switching function causes the electric motor to be switched on via the main switching means. The main switching means have been arranged between the first switching means and the electric motor because the electric motor is generally powered from an alternating voltage source and the drive circuit is powered from a direct voltage source.

A disadvantage of such an appliance is that in the event of a defect in the first pulse switch or in the first switching means, the electric motor is often switched on. When the appliance takes the form of, for example, a food processor the electric motor thus switched on may give rise to a hazardous situation owing to the rotatable cutter which is coupled to the electric motor.

SUMMARY OF THE INVENTION

It is an object in the invention to provide an appliance in which the electric motor is not switched on in the event of a defect of the first pulse switch or of the first switching means.

An appliance in accordance with the invention is characterised in that the circuit further comprises a second pulse switch for generating a second pulse and second switching means with a holding capability to perform a second switching function in response to the second pulse, the first switching function in combination with the second switching function being adapted to control the main switching means. The invention is based on the recognition of the fact that, in addition to a first circuit formed by the first pulse switch and the first switching means, a second circuit formed by the second pulse switch and the second switching means has to be energized in order to switch on the electric motor. Since the first pulse generated by the first pulse switch and the second pulse generated by the second pulse switch are needed to drive the respective switching means and, in addition, the first switching function performed by the first switching means and the second switching function performed by the second switching means are necessary to drive the main switching means, the electric motor is not switched on according to the invention in the event of a defect in one of the pulse switches or one of the switching means. As the second switching means, in a manner similar to the first switching means, exhibits a holding capability, the second switching means will be responsive to the second pulse generated by the second pulse switch to perform the second switching function for at least a second time interval, which second switching function in combination with the first switching function causes the electric motor to be switched on via the main switching means.

A first embodiment of an appliance in accordance with the invention may be characterised in that the first pulse switch and the second pulse switch are interdependent. An advantage of the interdependence of the pulse switches is that both the first and the second pulse are generated by means of one desired action and that the respective switching means are driven simultaneously. Conversely, the interdependence of the pulse switches does not imply that a defect of one pulse switch means a defect of the other pulse switch.

A second embodiment of an appliance in accordance with the invention may be characterised in that the first switching means comprise a microcomputer and a transistor, which microcomputer has a control input coupled to the first pulse switch and a control output coupled to the transistor, which transistor has a control electrode coupled to the control output and a main current path coupled to the main switching means. The second switching means may comprise a controlled unidirectional element, which element has a control electrode coupled to the second pulse switch and a main current path coupled to the main switching means. The main switching means may comprise an electromagnetic switching element, which switching element has a control current path coupled to the first and the second switching means and a main current path coupled in series with the electric motor, and the main current path of the transistor, the main current path of the controlled unidirectional element and the control current path of the electromagnetic element are coupled in series. The present embodiment provides a simple implementation of the first switching means, the second switching means and the main switching means, yielding a compact and well-designed circuit. The first switching means comprising the microcomputer and the transistor perform the first switching function in that the microcomputer is responsive to the first pulse received via its control input to drive the main current path of the transistor into conduction by means of a signal generated on its control output, which conductive state lasts for at least the first time interval owing to the holding capability provided by the microcomputer. The microcomputer can act, for example, as a timer. The second switching means comprising the controlled unidirectional element perform the second switching function in that the controlled unidirectional element is responsive to a second pulse received via its control electrode to drive its main current path into conduction, which conductive state lasts for at least the second time interval owing to the holding capability provided by the controlled unidirectional element. The controlled unidirectional element preferably takes the form of a thyristor, which is preferred because of the holding capability inherent in a thyristor. A signal current flowing through a main current path of a thyristor is maintained until the signal current has decreased below a value which is specific to the thyristor. As the main current paths of the transistor and of the controlled unidirectional element constituted by the thyristor are coupled in series, the signal current flowing through the main current path of the thyristor also flows through the main current path of the transistor, the signal current being monitored by the microcomputer which is coupled to the transistor. If, while the transistor conducts the microcomputer maintains the signal current above the value specific to the thyristor, the microcomputer will determine the second time interval by means of the first time interval. Moreover, the signal current flows through the control current path of the electromagnetic element which is coupled in series with the main current paths of the transistor and the thyristor, which element is responsive to the signal current to switch on the electric motor by means of its main current path. The electromagnetic element can be constructed, for example, by means of a rely.

A third embodiment of an appliance in accordance with the invention may be characterised in that the circuit further comprises control means for controlling the electric motor, and the first switching means are adapted to control means. Apart from controlling the electric motor the control means have an important further advantage. Since the main switching means and the control means are both capable of controlling the electric motor, a defect in one of said means will not result in the electric motor being switched on.

A modification of the third embodiment of an appliance in accordance with the invention may be characterised in that the first switching means have a control output, and the control means comprise a controlled bidirectional element, which element has a control electrode coupled to the control output and a main current path coupled in series with the electric motor. An advantage of the controlled bidirectional element is that the element can readily control alternating currents, which alternating currents occur when the electric motor is powered from an alternating voltage source. The controlled bidirectional element may be constituted by a triac.

A fourth embodiment of an appliance in accordance with the invention may be characterised in that the circuit further comprises a third pulse switch for generating a third pulse, the first switching means being adapted to reset the first switching function in response to the third pulse. The addition of the third pulse switch makes at least the first time interval variable, the first and the second pulse switches serving to switch on the electric motor and the third pulse switch serving to switch off the electric motor. If, in the present embodiment, the second switching means comprise, for example, the thyristor and, as a consequence, the second time interval defined by the thyristor is determined by means of the first time interval defined by the first switching means, the first switching means control both the turn-on and turn-off of the electric motor, which first switching means can be constructed, for example, by means of a flip-flop and the transistor.

BRIEF DESCRIPTION OF THE DRAWING

The aforementioned and other (more detailed) aspects of the invention will now be described more comprehensively and will be illustrated by means of the accompanying FIGURE, in which:

The FIGURE shows a part of an embodiment of an appliance in accordance with the invention, which part comprises an electric motor and a circuit for driving the electric motor.

DESCRIPTION OF THE PREFERRED EMBODIMENTS

The accompanying FIGURE shows a part of an embodiment of an appliance in accordance with the invention, which part comprises an electric motor M and a circuit for driving the electric motor. The electric motor M is coupled between two terminals 1 and 2, which terminals are coupled to two supply voltage terminals 3 and 4, respectively. In many cases the electric motor M is powered from an alternating voltage source via the supply voltage terminals 3 and 4, and the drive circuit is mainly powered from a direct voltage source via two supply voltage terminals 5 and 6. In practice the supply voltage terminals 3 and 5 are usually couped by means of a transformer circuit and the supply voltage terminals 4 and 6 are often coupled directly. The circuit used in the present embodiments comprises a firs pulse switch S1, a secnd pulse switch S2, a third pulse switch S3, first switching means ($\mu C$, T), second switching means (Th, R), main switching means (R1) and control means (Tr), the pulse switches S1 and S2 being interlocked. The first switching means ($\mu C$, T) comprise a microcomputer $\mu C$ and a transistor T, the microcomputer $\mu C$ having two supply inputs 7 and 8 coupled to the supply voltage terminals 5 and 6 respectively, a control input 9 coupled to the supply voltage terminal 5 by means of the pulse switch S1, a control output 10 coupled to the transistor T, a control output 11 coupled to the control means (TR), and a reset input 12 coupled to the supply voltage terminal 5 by means of the pulse switch S3. The transistor T is a bipolar NPN transistor having a control electrode coupled to the control output 10 and having a main current path coupled between the supply voltage terminals 5 and 6. The second switching means (Th, R) comprise a controlled unidirectional element in the form of a thyristor Th and a resistor R, the thyristor having a control electrode coupled to the supply voltage terminal 5 by means of the resistor R and the pulse switch S2, and having a main current path coupled in series with the main current path of the transistor T and connected to the supply voltage terminal 6, the resistor R defining a current generated by the second pulse. The main switching means (R1) are realised by means of a relay R1, which relay has a control current path, which is coupled in series with the main current path of the transistor T and is connected to the supply voltage terminal 5, and a main current path coupled in series with the electric motor M between the supply voltage terminal 3 and the terminal 1. The control means (Tr) comprise a controlled bidirectional element in the form of a triac Tr, which triac has a control electrode coupled to the control output 11 and a main current path coupled in series with the electric motor M and connected to the supply voltage terminal 4.

The part of the present embodiment of an appliance in accordance with the invention initiates starting of the electric motor M by effecting both a first switching function and a second switching function and it initiates stopping of the electric motor M by resetting the first switching function. The first switching function and the second switching function are respectively realised by means of a first circuit (S1, $\mu C$, T) comprising the pulse switch S1, the microcomputer μC and the transistor T and by means of a second circuit (S2, R, Th) comprising the pulse switch S2, the resistor R and the thyristor Th, the pulse switches S1 and S2 being interlocked to simultaneously generate a first and a second pulse, respectively. Since the first switching function performed by the first circuit (S1, μC, T) in combination with the second switching function performed by the second circuit (S2, R, Th) is necessary for driving the electric motor M via the main switching means formed by the relay R1, the electric motor M will not be switched on in the event of a defect in the pulse switch S1, the microcomputer μC or the transistor T, nor in the event of a defect in the pulse switch S2 or the thyristor Th. The first switching function is started in that the microcomputer μC in, response to a pulse received via its control input 9, drives the main current path of the transistor T into conduction by means of a signal generated on its control output 10, the holding capability of the microcomputer μC ensuring that conduction is sustained for at least a first time interval. The second switching function is started in that the thyristor Th is responsive to a second pulse received from the second pulse switch S2 via its control electrode to render its main current path conductive, which conductive state is sustained for a second time interval owing to the holding capability of the thyristor. This holding capability is a property inherent in a thyristor. A signal current through a main current path of the thyristor is sustained until the signal current decreases below a level specific to the thyristor. Since the main current paths of the transistor T and of the thyristor Th are coupled in series, the signal through the main current path of the transistor Th also flows through the main current path of the thyristor T, the signal current being controlled by the microcomputer μC coupled to the transistor. If, during conduction of the transistor T, the microcomputer μC maintains the signal current above the holding value requires by the thyristor Th, the microcomputer μC determines the second time interval by means of the first time interval. Since the main current paths of the transistor T and the thyristor Th are coupled in series with the control current path of the relay R1, the signal current through the main current paths will also flow through the control current path of the relay R1 and will cause the main current path of this relay R1 to become conductive.

The first switching function is reset by means of the pulse switch S3, the pulse switch S3 being adapted to generate a third pulse. The first switching function is reset in that the microcomputer μC is responsive to the third pulse received via its reset input 12 to turn off the main current path of the transistor T by means of the signal generated on its control output 10. As the main current path of the transistor T is cut off the signal current through the main current path of the thyristor Th decreases below the value specific to the thyristor and the thyristor Th is turned off.

The microcomputer μC not only plays a part in initiating both starting and stopping of the electric motor M but also in controlling the electric motor.

The electric motor M also is controlled by means of a third circuit (S1, μC, Tr) comprising the pulse switch S1, the microcomputer μC and the triac Tr. The electric motor M is controlled in that the microcomputer μC, in response to a first pulse received via its control input 9 the, drives the triac Tr into conduction by means of a control signal generated on its control output 11. This conduction is sustained for at least the first time interval owing to the holding capability of the microcomputer μC and is variable by means of the control signal in order to control the electric motor M. In addition to control of the electric motor M the triac Tr has another important advantage. As the main current paths of the triac Tr and of the relay R1 are coupled in series with the electric motor M, the electric motor will not be started in the case of a defect in the third circuit (S1, μC, Tr) comprising the triac Tr, nor in the case of a defect in the first circuit (S1, μC, T), the second circuit (S2, R, Th) or the relay R1.

Finally, it is to be noted that a defect in one the components used in the circuit in the part of the present embodiment of an appliance in accordance with the invention cannot lead to undesirable starting of the electric motor M. In order to signal a defect the circuit may be provided with indication means, which indication means audibly or visually indicate the occurrence of a defect. Such indication means can detect the occurrence of a defect, for example, by measuring currents or voltages in the circuit.

The invention is not limited to the embodiment shown herein. Within the scope of the invention several modifications are conceivable to those skilled in the art. For example, the first switching means, the second switching means, the main switching means and the control means can be implemented in numerous ways which differ from the embodiment shown. Moreover, the bipolar transistor shown herein can be replaced, for example, by a transistor of another type or by another switching element, and the resistor shown may be dispensed with, a resistor being added at one or more other locations in the circuit. When the control means are not used the main switching means constructed by means of the relay may be implemented, for example, by means of two parallel circuits, which circuits are arranged in series with the first and the second circuit respectively. An advantage of this implementation is that the electric motor is not started in the case of a defect in the main switching means. Moreover, the appliance may be constructed as a simple mixer, a drill, a lawn-mower or another tool.

I claim:

1. A drive circuit for an appliance which includes an electric motor, said drive circuit comprising: a first pulse switch for generating a first pulse, first switching means with a holding capability and which performs a first switching function in response to the first pulse, main switching means for switching electric current to the electric motor, a second pulse switch for generating a second pulse, and second switching means with a holding capability and which performs a second switching function in response to the second pulse, wherein the first switching function in combination with the second switching function together control the main switching means and thereby the flow of electric current to the electric motor.

2. A drive circuit as claimed in claim 1, wherein the first pulse switch and the second pulse switch are interdependent.

3. A drive circuit as claimed in claim 2, wherein the first switching means comprise a microcomputer and a transistor, which microcomputer has a control input coupled to the first pulse switch and a control output coupled to a control electrode of the transistor, and wherein the transistor has a main current path coupled to the main switching means.

4. A drive circuit as claimed in claim 3, wherein the second switching means comprise a controlled unidirectional element, which has a control electrode coupled to the second pulse switch and a main current path coupled to the main switching means.

5. A drive circuit as claimed in claim 1, wherein the main switching means comprise an electromagnetic switching element which has a control current path coupled to the first and the second switching means and a main current path coupled in series with the electric motor.

6. A drive circuit as claimed in claim 2, wherein the first switching means comprise a microcomputer and a transistor, which microcomputer has a control input coupled to the first pulse switch and a control output coupled to a control electrode of the transistor, which transistor has a main current path, wherein the second switching means comprise a controlled unidirectional element which has a control electrode coupled to the second pulse switch and a main current path, wherein the main switching means comprise an electromagnetic switching element which has a control current path and a main current path coupled in series with the electric motor, and wherein the main current path of the transistor, the main current path of the controlled unidirectional element and the control current path of the electromagnetic element are coupled in series to terminals for a source of voltage.

7. A drive circuit as claimed in claim 2, which further comprises control means for controlling the electric motor, and wherein the first switching means control the control means.

8. A drive circuit as claimed in claim 7, wherein the first switching means have a control output, and the control means comprise a controlled bidirectional element which has a control electrode coupled to the control output of the first switching means and a main current path coupled in series with the electric motor.

9. A drive circuit as claimed in claim 1, wherein the circuit further comprises a third pulse switch for generating a third pulse, the first switching means being adapted to reset the first switching function in response to the third pulse.

10. A fail-safe drive circuit for an electric motor, said drive circuit comprising:
a pair of input terminals providing a supply voltage for the electric motor,
a first pulse switch for generating a first pulse,
first switching means having a holding capability and responsive to said first pulse to perform a first switching operation,
a second pulse switch for generating a second pulse,
second switching means having a holding capability and responsive to said second pulse to perform a second switching operation, and
main switching means having a switchable main current path for connection in series with the electric motor to said pair of input terminals, and a control current path controlled jointly by the switching operations of the first and second switching means thereby to control a current flow in its main current path.

11. A fail-safe drive circuit as claimed in claim 10 wherein the first and second pulse switches are operative in synchronism.

12. A fail-safe drive circuit as claimed in claim 10 wherein the first and second switching means comprise first and second controlled semiconductor switching devices, respectively, coupled in series with the control current path of the main switching means to a further supply voltage terminal.

13. A fail-safe drive circuit as claimed in claim 10 further comprising, control means controlled by the first switching means and connected in series with the main current path of the main switching means so as to jointly control therewith current flow from said input terminals to an electric motor when connected to said main current path.

14. A fail-safe drive circuit as claimed in claim 13 wherein the first and second switching means comprise first and second controlled semiconductor switching devices, respectively, coupled in series with the control current path of the main switching means to a DC supply voltage terminal, and wherein said input terminals supply an AC voltage and said control means comprise a controlled bidirectional semiconductor element.

15. A fail-safe drive circuit as claimed in claim 12 wherein,
the first switching means further comprises a microcomputer having a control input coupled to the first pulse switch and a control output coupled to a control electrode of the first controlled semiconductor switching device,
the second controlled semiconductor switching device has a control input coupled to the second pulse switch, and
said further supply voltage terminal provides a DC voltage and said input terminals provide an AC voltage.

16. A drive circuit as claimed in claim 1, wherein the first switching means comprise a microcomputer and a transistor, said microcomputer having a control input coupled to the first pulse switch and a control output coupled to a control electrode of the transistor, and wherein the transistor has a main current path coupled to the main switching means.

17. A drive circuit as claimed in claim 16, wherein the second switching means comprise a controlled unidirectional element which has a control electrode coupled to the second pulse switch and a main current path coupled to the main switching means.

18. A drive circuit as claimed in claim 1, wherein the first switching means comprise a microcomputer and a transistor, said microcomputer having a control input coupled to the first pulse switch and a control output coupled to a control electrode of the transistor, said transistor having a main current path, wherein the second switching means comprise a controlled unidirectional element which has a control electrode coupled to the second pulse switch and a main current path, wherein the main switching means comprise an electromagnetic switching element which has a control current path and a main current path coupled in series with the electric motor, and wherein the main current path of the transistor, the main current path of the controlled unidirectional element and the control current path of the electromagnetic element are coupled in series to terminals for a source of voltage.

19. A drive circuit as claimed in claim 10, further comprising:
a controlled semiconductor switching element connected in series with the main current path of the main switching means thereby to jointly control with said main current path the flow of electric current to the electric motor, and means for coupling a control electrode of the controlled semiconductor switching element to a control output of the first switching means.

20. A food processor with protection against defects and comprising:
an electric motor,
a pair of input terminals providing a supply voltage for the electric motors,
a first pulse switch for generating a first pulse,
first switching means having a holding capability and responsive to said first pulse to perform a first switching operation,
a second pulse switch for generating a second pulse,
second switching means having a holding capability and responsive to said second pulse to perform a second switching operation, and
main switching means having a switchable main current path connected in series with the electric motor to said pair of input terminals, and a control current path controlled jointly by the switching operations of the first and second switching means thereby to control a current flow in its main current path, whereby in the off position of the first and second pulse switches, activation of the motor is prevented despite a defect in the first pulse switch, the second pulse switch, the first switching means or the second switching means.

* * * * *